April 21, 1953 G. F. NADEAU ET AL 2,635,962
DIMENSIONALLY STABLE CELLULOSE ESTER
LITHOGRAPHIC PRINTING PLATES
Filed July 12, 1950 2 SHEETS—SHEET 1

Gale F. Nadeau
Clemens B. Starck
INVENTORS
Daniel J. Mayne
BY Leonard E. Brancken
ATTORNEY & AGENT April 21, 1953 G. F. NADEAU ET AL 2,635,962

DIMENSIONALLY STABLE CELLULOSE ESTER LITHOGRAPHIC PRINTING PLATES

Filed July 12, 1950 2 SHEETS—SHEET 2

Gale F. Nadeau
Clemens B. Starck
INVENTORS

BY David J. Mayne
Leonard E. Brancken
ATTORNEY & AGENT

Patented Apr. 21, 1953

2,635,962

UNITED STATES PATENT OFFICE 2,635,962

DIMENSIONALLY STABLE CELLULOSE ESTER LITHOGRAPHIC PRINTING PLATES

Gale F. Nadeau and Clemens B. Starck, Rochester, N. Y., assignors to Eastman Kodak Company, Rochester, N. Y., a corporation of New Jersey Application July 12, 1950, Serial No. 173,378

8 Claims. (Cl. 95—8)

This invention relates to the preparation of light-sensitive photographic elements protected against halation and free from dimensional and chemical instability and particularly designed for use in making lithographic printing plates.

This application is a continuation-in-part of our copending application Serial No. 75,444, filed February 9, 1949 now U. S. Patent 2,596,713.

Printing plates of the lithographic type are well known having been prepared previously, for example, from metal plates carrying sensitive colloid layers and from cellulose ester plates carrying a sensitive stratum or layer. In processes for making such plates, as in many photographic processes utilizing light-sensitive layers, in order to avoid halation effects, it is desirable to provide the sensitive element with an antihalation layer or an incorporated dyestuff which absorb rays of light transmitted by the sensitive layer and thereby minimize or completely avoid back reflections which adversely effect the definition of the relief image. R. S. Colt, in United States Patent 2,448,861, dated September 7, 1948, describes a method for preparing cellulose ester printing plates according to which a surface hydrolyzed cellulose ester sheet is sensitized with a bichromate such as potassium bichromate, and after exposure under a design, the exposed area is removed with aqueous solutions of chlorites or hypochlorites such as, for example, sodium hypochlorite, thereby providing ink-receptive areas in the region of the exposure and ink-repellant areas, when moistened, in the region of the unexposed areas. In this process, it is also highly desirable to provide the sensitive printing plate with an antihalation layer and, following the usual practice in the art, it might appear that the antihalation layer coated on the rear surface of the sensitive plate would provide the necessary protection from halation effects. However, it has been found that when such elements are subjected to alkaline hydrolysis by immersion methods to produce a stratum of hydrolyzed cellulose ester on the surface of the plate, the dye layer tends to be removed in the process leaving the residual dye in uneven and mottled condition, as well as contaminating the hydrolysis bath with dyestuff. Another disadvantage of such elements is that while satisfactory as a printing plate for short runs, on continued running they tend to stretch and pull out from clamps of the type used on many small offset presses. Accordingly, such elements have been found to lack dimensional and chemical stability for precision registration on long runs.

While reinforcing materials such as thin metal foils have been proposed heretofore for reinforcing various cellulose ester photographic elements, all attempts to produce a highly satisfactory type of surface hydrolyzed and sensitized cellulose ester printing plate provided with a thin metal foil reinforcement have failed for one reason or another. For example, when thin metal foil is used as the reinforcing material, the usual bonding pastes or cements tend to break down and allow the cellulose ester coat or sheet to pull away from the metal foil at the edges of the composite plate, especially when the composite element or plate is subjected to the action of aqueous caustic solutions in the step of forming the surface hydrolyzed layer or surface on the cellulose ester coating or sheet. Subsequent treatment by various processing solutions and by prolonged use of the finished printing plate in contact with printing inks causes a similar distortion or peeling at the edges of the plate. Where the reinforcing metal foil is zinc or aluminum, the aqueous caustic hydrolyzing solution vigorously attacks and corrodes the metal foil. Protective coatings or backings commonly employed to protect metal surfaces, when applied to the exposed back surface of the metal foil of the above type of composite plate have been found impractical to use or ineffective in that the bonding of the metal to the cellulose ester or to the coating or backing does not hold firmly as desired, or in that the protective coating or backing is etched or dissolved away under the action of the hydrolyzing caustic solution.

We have now found that excellent light-sensitive photographic elements, designed for preparing lithographic printing plates, which are protected against halation effects and intimately bonded to reinforcing metal foil, and which have none of the aforesaid disadvantages of dimensional instability and adverse susceptibility to processing solutions, can be prepared as described hereinafter.

It is, accordingly, an object of our invention to provide a light-sensitive element having dimensional and chemical stability and protected against halation for use in making lithographic printing plates. A further object is to provide a lithographic printing plate having dimensional and chemical stability and provided with an antihalation layer or dyestuff. Another object is to provide a novel process for preparing a photographic element having dimensional stability, inertness to chemical baths and protected against halation. Other objects of the invention will become apparent from the following description.

In the accompanying illustrative drawings, Figs. 1–5, Fig. 1 is an enlarged, diagrammatic cross-sectional view of a single cellulose acetate sheet laminated to aluminum foil;

Figure 1:
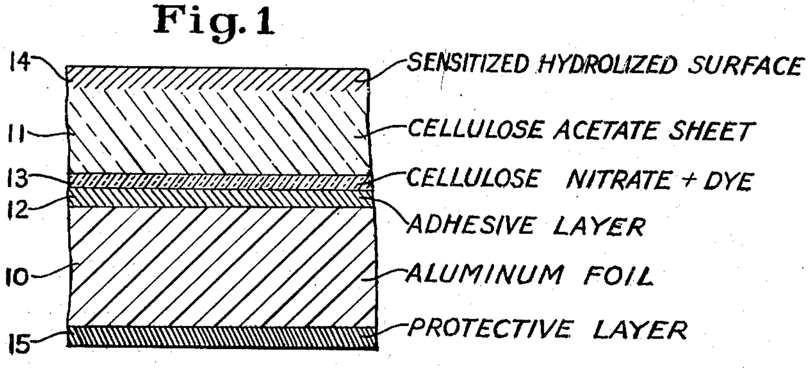

In accordance with our invention, we prepare our new light-sensitive photographic elements of the surface hydrolyzed and sensitized cellulose organic acid ester type in a number of modifications, wherein the reinforcing material is a metal foil of from 0.002–0.005-inch thickness, depending on what type and thickness of element is desired. One form of the invention comprises an element having an overall thickness of approximately 0.006-inch and is prepared by bonding a coated layer of a cellulose organic acid ester containing an antihalation dye incorporated therein to a metal foil such as zinc, aluminum, etc. by means of an interlayer or subcoated on the foil of a resinous thermoplastic material, the other side of the foil being protected against the hydrolyzing and processing solutions by a similar layer of a resinous thermoplastic material coated thereon, curing the coated foil and subjecting it to a hydrolyzing bath, followed by sensitization of the resulting hydrolyzed outer surface of the cellulose organic acid ester layer with a suitable sensitizing agent. Another form of the invention having an overall thickness of 0.010-inch or more is prepared as above, but the cellulose organic acid ester is applied to both sides of the subbed metal foil and at least one of the resulting outer surfaces is hydrolyzed and sensitized. Still another form of the invention having an overall thickness of 0.006–0.010-inch and more comprises a laminated product having a sheet of cellulose organic acid ester containing an antihalation dye bonded to one or both sides of a metal foil such as mentioned by means of an adhesive or cementing material consisting essentially of a resinous, thermoplastic material. At least one of the resulting sheet surfaces is subjected to hydrolysis and sensitization with a suitable sensitizer. Where only one side of the metal foil is laminated to a sheet of cellulose organic acid ester, the other side of the metal foil is protected with a thin layer applied thereto of a resinous, thermoplastic material which is inert to the action of the hydrolyzing and processing baths. The coating and laminating processes lend themselves readily to continuous type of operations. Further modifications of our invention will become apparent from the description and examples.

The materials we employ for forming the above-described products of our invention include sheets and coatings of various cellulose organic acid esters such as substantially fully esterified cellulose acetate having the maximum resistance to moisture and containing about 43.5% by weight of acetyl groups, although other esters of equivalent properties and acyl content such as cellulose propionate, cellulose acetate-propionate, etc., also give satisfactory results. In general, it is more convenient to employ clear sheets and solutions of the cellulose esters, but satisfactory results are also obtainable with sheets and solutions of the cellulose esters which are translucent or relatively opaque to certain wave lengths of light. However, an antihalation dyestuff is always contained either as a coating or incorporated in the various cellulose esters employed in our invention. The sheets of cellulose organic acid ester are usually, but not necessarily, coated on the side to be cemented to the metal foil with a thin layer of cellulose nitrate, which can also contain the antihalation dye. Here and in the appended claims, it will be understood that the terms "layer" and "sheet" describe equivalent structure and are used interchangeably. In the hydrolysis step, the cellulose ester sheet is hydrolyzed on the surface to the predetermined depth, always leaving a stratum unhydrolyzed. This can be accomplished by simply immersing the laminate or the coated metal foil for a few minutes in an aqueous alcoholic solution of a caustic alkali (e. g., sodium hydroxide, potassium hydroxide, lithium hydroxide, etc.), followed by washing the hydrolyzed product with water, neutralizing residual alkali with weak acid solution such as a lower fatty acid (e. g. 1–5% aqueous acetic acid). If desired, only one outer surface need by hydrolyzed by applying the hydrolyzing solution thereto by well known methods. The concentration of the hydrolyzing solution can be varied to some extent, depending on the time of exposure and the temperature of the bath. A suitable solution is 5% sodium hydroxide in equal parts of ethyl alcohol and water, which gives good hydrolyzing results at 70° F. in three minutes exposure. By operating at 60° F., the time required is somewhat longer, whereas at 100° F. the required time is considerably shorter and more critical.

The subbing solutions which show satisfactory adhesion to metal foil, particularly to aluminum foil, and to coated solutions of cellulose esters, particularly to solutions of cellulose triacetate are of the resinous copolymeric thermoplastic type such as can be prepared by copolymerizing various mixtures of vinyl chloride and vinyl acetate. A suitable subbing solution consists of 6% by weight of a copolymeric resin, containing 86% by weight of vinyl chloride groups, 13% by weight of vinyl acetate groups and 1% by weight of an $\alpha,\beta$-unsaturated dicarboxylic acid such as maleic or fumaric acid groups, 45% by weight of butyl acetate and 49% by weight of methylene chloride. In place of methylene chloride, other solvents in admixture with each other or with methylene chloride can be employed such as acetone, 1,4-dioxane, ethylene dichloride, etc. The preferred subbing solution is a 6% solution of the above-mentioned copolymeric resin in methylene chloride. The cements employed for laminating cellulose ester sheets, particularly cellulose triacetate sheets, to uncoated metal foils, particularly to aluminum foil, are also of the copolymeric thermoplastic type such as mentioned above for making subbing solutions, but contain an additional resinous material. A suitable cement consists of 4.5% by weight of the copolymeric resin mentioned above, 4.5% by weight of a low viscosity cellulose nitrate, 35% by weight of acetone and 56% by weight of butyl acetate. The preferred cement for firmly laminating cellulose ester sheets, particularly cellulose acetate sheets which have been coated with a thin layer of cellulose nitrate on the side to be cemented to the metal foil and more particularly to aluminum foil, consists of 12% by weight of polyvinyl acetate, 4% by weight of a copolymeric resin such as employed in our subbing solutions and 84% by weight of methylene chloride. This cement is more a dispersion than a homogeneous solution. The methylene chloride can be replaced in whole or in part, if desired, by other solvents such as acetone, 1,4-dioxane, ethylene dichloride, etc. Where the cellulose ester, particularly cellulose acetate, is coated from a solution onto the subbed surface of the metal foil, particularly to the subbed surface of aluminum foil, a suitable solution or dope is, for example, 6–12% by weight of cellulose triacetate, in a solvent mixture consisting predominantly of methylene chloride with minor proportions of isopropyl alcohol and ethylene dichloride. The preferred solution consists of 8% by weight of cellulose triacetate, 80% by weight of methylene chloride, 7% by weight of isopropyl alcohol and the balance of ethylene dichloride. The antihalation dyestuff is selected from those which absorb in the blue and ultraviolet regions of the spectrum, and which are compatible with the cellulose nitrate solutions employed for providing the cellulose ester sheets intended for lamination with a thin layer of cellulose nitrate. The preferred dye is used in a concentration of about 3%, although considerable variation is possible. As indicated previously, where the cellulose ester is coated on the metal foil, the dye is incorporated in the cellulose ester solution or dope, whereas where the lamination method is used, it is applied to one surface of the cellulose ester sheet either as a dye solution in a suitable solvent followed by overcoating with a thin cellulose nitrate solution or by incorporation directly into the cellulose nitrate solution, the solution then being coated on one surface of the cellulose ester sheet. A suitable cellulose nitrate solution in which the dye is incorporated can contain from 1 to 4% by weight of cellulose nitrate in from 99 to 96% by weight of a solvent mixture consisting of, for example, 10 parts of β-methoxyethanol, 50 parts of acetone and 40 parts of methanol.

Suitable sensitizers include compounds which like bichromate (e. g. ammonium bichromate, sodium bichromate, potassium bichromate, etc.) will quickly oxidize hydrolyzed cellulose ester in the presence of blue or ultraviolet light, transmitted by a design such as a line or halftone negative, to an alkali-soluble state, and include other sensitizing compounds such as ferric ammonium oxalate, which can be used in conjunction with a ferricyanide (e. g. potassium ferricyanide, etc.), and which is reducible to ferrous salt images in the presence of light, but which does not oxidize cellulose in the presence of light, so that it is necessary to use alkaline-oxidizing solutions such as hydrogen peroxide in dilute aqueous alkali-metal hydroxide (e. g. sodium hydroxide, potassium hydroxide, etc.) to effect removal of the hydrolyzed cellulose ester in the exposed area. For a detailed description of suitable sensitizers and method of application, and subsequent development of the relief image, reference can be had to copending Kenyon and Unruh application Serial No. 75,453 (now U. S. Patent No. 2,548,537, dated April 10, 1951) and Kenyon and Cathcart application Serial No. 75,452 (now U. S. Patent No. 2,568,503, dated September 18, 1951), both filed February 9, 1949.

The following examples and cross-sectional drawings will serve to illustrate further our new light-sensitive photographic elements protected against halation and free from dimensional and chemical instability, and the manner of obtaining the same.

*Example 1*

A light-sensitive photographic element designed for preparing a lithographic printing plate of approximately 0.006-inch thickness was prepared by coating a clear sheet of cellulose acetate of 0.003-inch thickness on one side with a solution of cellulose nitrate containing a blue-absorbing dye such as described in United States Patent 2,264,303, to J. B. Dickey, dated December 2, 1941, particularly p-nitrobenzene-azo-β-hydroxyethyl-o-chloroaniline. After coating and drying, the sheet was laminated to an aluminum foil of 0.003-inch thickness with the dyed surface toward the aluminum foil by bringing the coated cellulose acetate sheet and the aluminum foil together between pressure rollers with a bead of cement between. The other side of the aluminum foil was then coated with a 6% solution of a resinous copolymer consisting by weight of 86% vinyl chloride groups, 13% vinyl acetate groups and 1% of dibasic acid groups such as maleic or fumaric acid groups, and the laminate then dried. The laminate was then subjected to hydrolysis and subsequent sensitization with ammonium bichromate, followed by exposure through a suitable design and development of a relief image following the procedure described in Example 2. The compositions of the cellulose nitrate solution containing the antihalation dye and the cement solution were the same as employed in Example 2. The printing plate obtained was free from dimensional distortions and weaknesses and gave excellent results over an extended period of operation. Other sensitizers such as those previously mentioned can be employed in place of the ammonium bichromate in the above example.

The sensitized hydrolyzed element prepared as above-described is shown in cross-section in Fig. 1, wherein the cellulose acetate sheet 11 having an outer hydrolyzed and sensitized stratum 14 and an inner layer 13 containing an antihalation dye and cellulose nitrate is bonded as shown to a thin aluminum foil 10 by means of an adhesive layer 12, the outer surface of the aluminum foil being protected against chemical baths by a relatively thin layer 15 of a copolymeric resin.

*Example 2*

A light-sensitive photographic element designed for preparing a lithographic printing plate of approximately 0.010-inch thickness was prepared by coating on one side of a clear sheet of cellulose acetate of 0.00325-inch thickness a solution of cellulose nitrate containing a blue-absorbing dye such as described in United States Patent 2,264,303, of J. B. Dickey, dated December 2, 1941, particularly p-nitrobenzene-azo-β-hydroxyethyl-o-chloroaniline. After coating and drying the sheet, it was laminated to an aluminum sheet of 0.003-inch thickness with the dyed surface toward the aluminum foil by bringing the coated cellulose acetate sheet and aluminum sheet together between pressure rollers with a bead of cement between. A second sheet of 0.00325-inch thickness cellulose acetate, similarly coated with a cellulose nitrate solution, which in this case may or may not contain an added dye, was laminated in similar manner to the other side of the aluminum sheet. The preferred dye was used in a concentration of approximately 3 gms. of the dye to each 100 gms. of a cellulose nitrate solution made up to contain 2 gms. of cellulose nitrate dissolved in 98 gms. of a solvent mixture consisting by weight of 10 parts of β-methoxyethanol, 50 parts of acetone and 40 parts of methanol. The cement consisted of 12% by weight of polyvinyl acetate, 4% by weight of a copolymeric resin containing in each molecule approximately 86% by weight of vinyl chloride groups, 13% by weight of vinyl acetate groups and 1% by weight of dibasic acid groups such as maleic or fumaric acid groups, in 84% by weight of methylene chloride.

The double laminated plate prepared as above-described was surface hydrolyzed on both sides, by passing it through 5% sodium hydroxide in equal parts of ethyl alcohol and water, the hydrolyzing time being approximately 3 minutes at a bath temperature of 70° F. The laminate was then passed through an acid stop bath consisting of 2% glacial acetic acid in water, washed with water and dried. By this treatment there was obtained a hydrolyzed stratum on each side of the laminate each of which had a thickness on the order of one micron. By varying the hydrolysis conditions, the thickness of the hydrolyzed stratum can be varied 100% each side of the above-mentioned figure. The hydrolyzed laminate remained perfectly flat, showed no tendency to peel, the antihalation layer was undisturbed and the sandwiched-in aluminum foil was entirely unaffected by the hydrolysis treatment.

The hydrolyzed laminate was then sensitized by treating one of the hydrolyzed surfaces with an aqueous solution of ammonium bichromate under non-actinic light conditions, and the sensitized laminate exposed under a suitable design such as a line or halftone negative and developed to a relief image by lightly swabbing the exposed surface with a 2% aqueous caustic soda solution. The brown image which had formed an exposure soon disappeared and the hydrolyzed cellulose acetate was gradually removed from the exposed area. Following neutralization of the excess alkali with 2% aqueous acid solution, it was found that the exposed and developed areas readily received greasy printing inks, whereas the areas containing unexposed hydrolyzed cellulose acetate, when moistened, repelled such inks. The product thus obtained was free from dimensional distortions and weaknesses and gave excellent results as a printing plate over an extended period of operation. Other sensitizers such as those previously mentioned can be employed in place of the ammonium bichromate in the above example.

Figure 2:
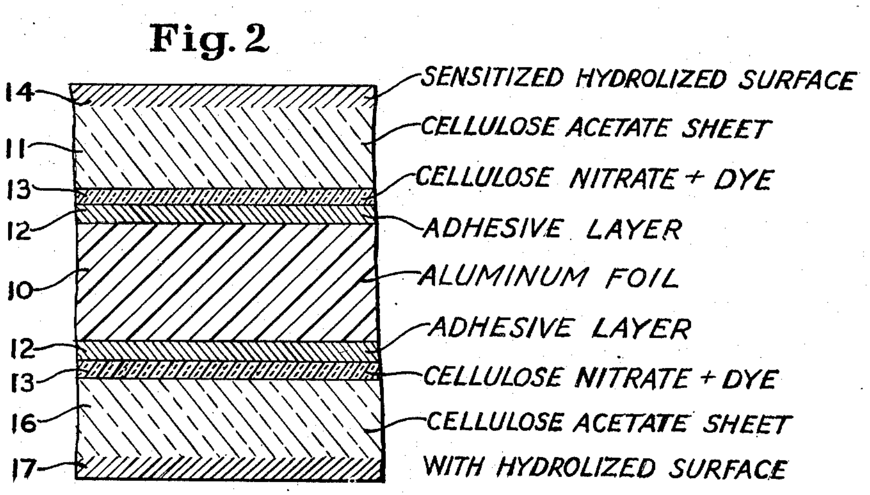
Fig. 2 is similar to Fig. 1 but denotes a double laminated aluminum foil.

The light-sensitive photographic element prepared as described in the above example is shown in cross-section in Fig. 2, wherein the cellulose acetate sheet 11 having an outer hydrolyzed and sensitized stratum 14 and an inner layer 13 containing an antihalation dye and cellulose nitrate is bonded as shown to a thin aluminum foil 10 by means of an adhesive layer 12, and wherein the other surface of the aluminum foil is similarly bonded by means of adhesive 12 to a second sheet of cellulose acetate 16 having a similar inner layer 13 containing an antihalation dye and cellulose nitrate and which sheet may or may not have an outer hydrolyzed stratum 17 depending on the manner of production.

*Example 3*

A light-sensitive photographic element designed for preparing a lithographic printing plate of approximately 0.006-inch thickness was prepared by first subbing an aluminum foil of 0.0045-inch thickness on one or both sides with a solution consisting of 6% of a copolymeric resin containing in each molecule 86% by weight of vinyl chloride groups, 13% by weight of vinyl acetate groups and 1% by weight of dibasic acid groups such as maleic or fumaric acid groups, in methylene chloride, drying the sublayer, and then coating a layer of cellulose acetate solution over one of the subbed surfaces of the aluminum foil in such manner that there results an aluminum foil having on one side a firmly bonded layer of cellulose acetate of approximately 0.0015-inch thickness. The solution employed for coating the aluminum foil consisted by weight of 8% of cellulose triacetate, 80% of methylene chloride, 7% of isopropyl alcohol and 5% of ethylene dichloride. An antihalation dye which absorbs light in the blue region of the spectrum such as described in United States Patent 2,264,303, of J. B. Dickey, dated December 2, 1941, particularly p-nitrobenzene-azo-β-hydroxyethyl-o-chloroaniline, was incorporated in the cellulose triacetate coating solution or dope in an amount equivalent to 1% based on the weight of the solution. After curing the coated foil, it was subjected to hydrolysis and subsequent sensitization with ammonium bichromate, followed by exposure through a suitable design and development of a relief image following the procedure described in Example 2. If the subbing solution is applied only to the side of the foil which is to be coated, then prior to the hydrolysis step the other face of the foil must be coated with a thin coating of resinous material such as the subbing solution, to protect the foil from the etching action of the caustic hydrolyzing bath. Other sensitizers such as those previously set forth can likewise be employed in place of the ammonium bichromate in the above example. Excellent results were obtained on long extended operation in a press with the printing plate prepared as above described.

Figure 3:
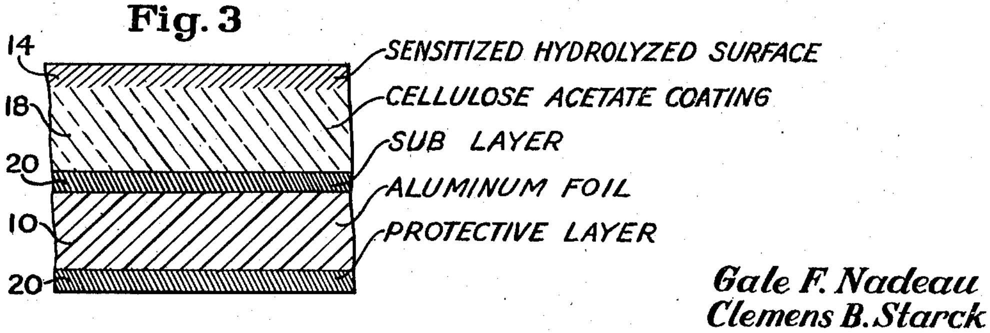
Fig. 3 is similar to Fig. 1, but differs therefrom in that a single layer of cellulose acetate is coated over one side of an aluminum coil.

The sensitized hydrolyzed element prepared in the above example is shown in cross section in Fig. 3, wherein the cellulose acetate layer 18 having an outer sensitized hydrolyzed stratum 14 and an antihalation dye incorporated therein, is firmly bonded as shown to a thin aluminum foil 10 having a thin layer 20 of a subbing compound which acts as an adhesive, and wherein the other side of the foil is protected with a layer 20 of the subbing compound or some other resinous material which is unaffected by the hydrolyzing bath.

A variation of the procedure of the above example which gives almost as good quality printing plate comprises first subbing the aluminum foil with an undercoating consisting of a solution of 6% by weight of a copolymeric resin of vinyl chloride, vinyl acetate and maleic acid such as previously mentioned, 45% by weight of butyl acetate and 49% by weight of methylene chloride. After drying, the subbed foil was coated with an intermediate coat consisting of 4.5% by weight of the same copolymeric resin, 4.5% by weight of low viscosity cellulose nitrate, 35% by weight of acetone and 56% by weight of butyl acetate. The double coated foil was dried and then overcoated with a solution containing 8% by weight of cellulose triacetate and 1% by weight of an equal mixture of Eastone Orange 2 R Cake and Eastone Yellow 6 G N as antihalation dyes, dissolved in a mixture of 90–10 ethylene dichloride and methyl alcohol. After curing, the product prepared as above was surface hydrolyzed and sensitized, exposed and developed, following the procedure described in Example 2.

Figure 4:
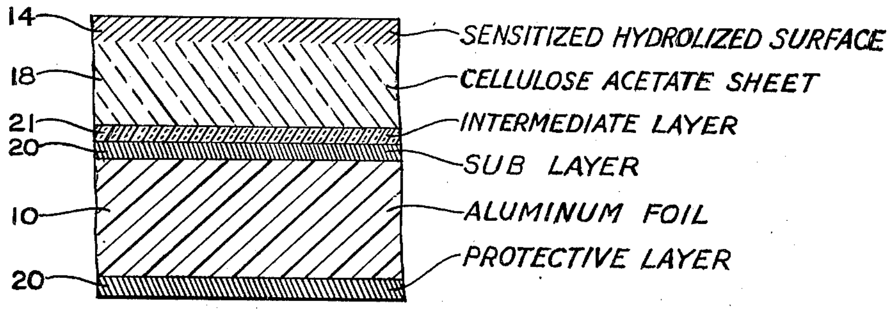
Fig. 4 is a variation of the product denoted by Fig. 3 in that an intermediate layer is employed for adhesive purposes.

The sensitized hydrolyzed element prepared as described in the above variation is shown in cross-section in Fig. 4, wherein the cellulose acetate layer 18 having an outer sensitized hydrolyzed stratum 14 and an antihalation dye incorporated therein is firmly bonded as shown to an aluminum foil 10 having a thin layer 20 on each side, the inner side facing the cellulose acetate having the second or intermediate layer 21 overcoated on layer 20 of a mixture of a copolymeric resin and cellulose nitrate to promote better adhesion.

*Example 4*

A light-sensitive photographic element designed for preparing a lithographic printing plate of approximately 0.010-inch thickness was prepared by first subbing an aluminum foil of 0.003-inch thickness on both sides with a solution consisting of 6% of a copolymeric resin containing in each molecule approximately 86% by weight of vinyl chloride, 13% by weight of vinyl acetate and 1% by weight of dibasic acid groups such as maleic or fumaric acid groups, in methylene chloride, drying the foil and then overcoating the subbed foil with a cellulose acetate solution so that there resulted an aluminum foil having on each side firmly bonded layers of cellulose acetate of approximately 0.00325-inch thickness. The solution employed for coating the aluminum foil consisted by weight of 8% of cellulose triacetate, 80% of methylene chloride, 7% of isopropyl alcohol and 5% of ethylene dichloride. An antihalation dye which absorbed light in the blue region of the spectrum such as described in United States Patent 2,264,303, of J. B. Dickey, dated December 2, 1941, particularly p-nitrobenzene-azo-$\beta$-hydroxy-ethyl-o-chloroaniline, was incorporated in the cellulose triacetate coating solution in an amount equivalent to 1% based on the weight of the dope. After curing the double coated aluminum foil, it was subjected to hydrolysis and subsequent sensitization with ammonium bichromate, followed by exposure through a suitable design and development of a relief image following the procedure described in Example 2. Other sensitizers such as those set forth previously can also be employed in place of the ammonium bichromate in the above example. Excellent results were obtained on long extended operation of the printing plate thus obtained.

Figure 5:
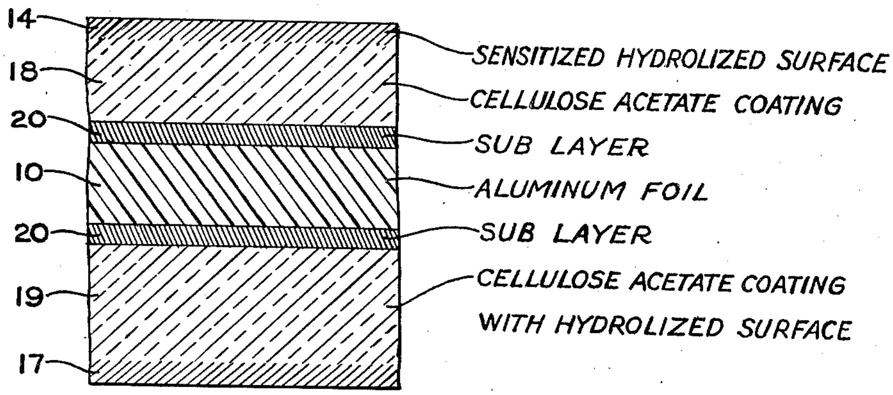
Fig. 5 is similar to Fig. 3, but differs therefrom by showing a coating of cellulose acetate over both sides of the aluminum foil.

The sensitized hydrolyzed element prepared as described in the above example is shown in cross-section in Fig. 5, wherein the cellulose acetate layer 18 having an antihalation dyestuff incorporated therein and an outer hydrolyzed sensitized stratum 14, is firmly bonded as shown to a thin aluminum foil 10 having a thin layer 20 of a subbing compound which acts as an adhesive, and where the other side of the foil is similarly subbed and bonded to cellulose acetate layer 19 which may or may not contain an antihalation dyestuff, and which also may or may not contain an outer hydrolyzed stratum 17 depending on the manner of production.

While no detailed description of the coating technique employed with the solutions of cellulose esters is included in the preceding examples, it will be understood that such operations follow well established procedures for obtaining flat, smooth, bubble-free layers of the material to be coated on various flat surfaces. Generally, the solution or dope is coated at or slightly above room temperature and then cured at elevated temperatures, but substantially below the boiling point of the solvent. The actual coating can be accomplished by immersion, by coating from a hopper or by spraying methods.

Proceeding as shown in the foregoing examples, other light-sensitive photographic elements of generally similar properties can also be prepared, for example, by replacing the cellulose acetate solutions and sheets with cellulose propionate or cellulose acetate-propionate solutions and sheets of equivalent acyl content and moisture resistance. Such elements can be similarly hydrolyzed, sensitized, exposed and developed to relief images which have similar selective receptivity for printing inks and show equivalent resistance to dimensional distortion under extended printing press operation.

What we claim is:

1. A light-sensitive photographic element comprising an alumium foil and a sheet of cellulose organic acid ester bonded together with an interlayer comprising essentially a resinous copolymer of vinyl chloride, vinyl acetate and an $\alpha,\beta$-ethylenically unsaturated dicarboxylic acid adherent thereto, the said cellulose organic ester sheet having a layer of cellulose nitrate containing an antihalation dye on the inner surface and a hydrolyzed stratum on the outer surface sensitized with an agent selected from the class consisting of oxidants for cellulose in the presence of light and light-reducible ferric salts incapable of oxidation of cellulose to the alkali-soluble state in the presence of light, and the said aluminum foil having the outer surface thereof covered with a protective layer of the said resinuous copolymer.

2. A light-sensitive photographic element comprising an aluminum foil and a sheet of cellulose organic acid ester sheet bonded together with an interlayer comprising essentially a resinous copolymer of vinyl chloride, vinyl acetate and an $\alpha,\beta$-ethylenically unsaturated dicarboxylic acid adherent thereto, the said cellulose organic acid ester sheet having a layer of cellulose nitrate containing an antihalation dye on the inner surface and a hydrolyzed stratum on the outer surface sensitized with an agent selected from the class consisting of oxidants for cellulose in the presence of light and light-reducible ferric salts incapable of oxidation of cellulose to the alkali-soluble state in the presence of light, and the said aluminum foil having the outer surface thereof covered with a composite protective layer of the said resinous copolymer adjacent to the foil and a second sheet of the said cellulose organic acid ester adhered thereover.

3. The light-sensitive photographic element of claim 1 in which the cellulose organic acid ester is cellulose triacetate.

4. The light-sensitive photographic element of claim 2 in which the cellulose organic acid ester is cellulose triacetate.

5. A method for preparing a photographic element which comprises coating a composition of cellulose nitrate and an antihalation dye on the surface of a sheet of cellulose organic acid ester, bonding the coated side of said sheet to an aluminum foil by means of an adhesive interlayer consisting essentially of a copolymer of vinyl chloride, vinyl acetate and an $\alpha,\beta$-ethylenically unsaturated dicarboxylic acid, applying to the other side of said foil a protective layer of said copolymer, and hydrolyzing an outer stratum of said cellulose organic acid ester layer.

6. A method for preparing a photographic element which comprises coating a composition of cellulose nitrate and an antihalation dye on the surface of a sheet of cellulose organic acid ester, bonding the coated side of said sheet to an aluminum foil by means of an adhesive interlayer consisting essentially of a copolymer of vinyl chloride, vinyl acetate and an α,β-ethylenically unsaturated dicarboxylic acid, then bonding in similar manner a second sheet of cellulose nitrate coated cellulose organic ester to the other side of said foil, and hydrolyzing an outer stratum of at least one of said sheets containing the antihalation dye.

7. A method for preparing a photographic element according to claim 5 in which the cellulose organic acid ester is cellulose triacetate.

8. A method for preparing a photographic element according to claim 6 in which the cellulose organic acid ester is cellulose triacetate.

GALE F. NADEAU.
CLEMENS B. STARCK.

References Cited in the file of this patent

UNITED STATES PATENTS

| Number | Name | Date |
|---|---|---|
| 2,548,537 | Kenyon et al. | Apr. 10, 1951 |
| 2,568,503 | Kenyon et al. | Sept. 18, 1951 |
| 2,569,954 | Ruebensaal | Oct. 2, 1951 |